United States Patent
Suzuki et al.

(10) Patent No.: US 12,151,845 B2
(45) Date of Patent: Nov. 26, 2024

(54) PREFORM ASSEMBLY, DOUBLE CONTAINER, AND METHOD OF MANUFACTURING DOUBLE CONTAINER

(71) Applicant: YOSHINO KOGYOSHO CO., LTD., Tokyo (JP)

(72) Inventors: Takanori Suzuki, Tokyo (JP); Osamu Jono, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 0 days.

(21) Appl. No.: 18/384,644

(22) Filed: Oct. 27, 2023

(65) Prior Publication Data

US 2024/0051702 A1 Feb. 15, 2024

Related U.S. Application Data

(62) Division of application No. 17/598,431, filed as application No. PCT/JP2020/009504 on Mar. 5, 2020, now Pat. No. 11,851,235.

(30) Foreign Application Priority Data

Mar. 28, 2019 (JP) .................................. 2019-064660

(51) Int. Cl.
*B65D 1/02* (2006.01)
*B29B 11/04* (2006.01)
(Continued)

(52) U.S. Cl.
CPC ............ *B65D 1/0246* (2013.01); *B29B 11/04* (2013.01); *B29C 49/0208* (2022.05);
(Continued)

(58) Field of Classification Search
CPC .... B65D 1/0246; B65D 1/023; B65D 1/0276; B65D 1/0261; B65D 1/0215; B65D 1/40;
(Continued)

(56) References Cited

U.S. PATENT DOCUMENTS

| 6,742,676 B2 | 6/2004 | Nakamura et al. |
| 6,981,617 B2 | 1/2006 | Nakamura et al. |
| 2019/0210758 A1 | 7/2019 | Casper et al. |

FOREIGN PATENT DOCUMENTS

| JP | 2000-062745 A | 2/2000 |
| JP | 2003-192031 A | 7/2003 |
(Continued)

OTHER PUBLICATIONS

Jun. 2, 2020 International Search Report issued in International Patent Application No. PCT/JP2020/009504.
(Continued)

*Primary Examiner* — Robert J Hicks
(74) *Attorney, Agent, or Firm* — Oliff PLC

(57) ABSTRACT

A preform assembly includes: an outer preform that includes an outer mouth portion and a stretch portion connected to the outer mouth portion and in which a recess extending in a vertical direction is provided on an inner surface of the stretch portion; and an inner preform that includes an inner mouth portion and a stretch portion connected to the inner mouth portion, wherein an outside air introduction port
(Continued)

communicating with a part between the outer preform and the inner preform is provided in a mouth portion composed of the outer mouth portion and the inner mouth portion located on an inner side of the outer mouth portion.

2 Claims, 8 Drawing Sheets

(51) Int. Cl.
*B29C 49/02* (2006.01)
*B29C 49/08* (2006.01)
*B29C 49/22* (2006.01)
*B65D 79/00* (2006.01)
B29K 67/00 (2006.01)
B29L 31/00 (2006.01)

(52) U.S. Cl.
CPC ............ *B29C 49/085* (2013.01); *B29C 49/22* (2013.01); *B65D 1/0276* (2013.01); *B65D 79/0084* (2020.05); B29C 2949/0744 (2022.05); B29C 2949/3026 (2022.05); B29K 2067/003 (2013.01); B29L 2031/7158 (2013.01); B65D 2501/0027 (2013.01)

(58) Field of Classification Search
CPC ................ B65D 79/005; B65D 79/008; B65D 79/0084; B65D 2501/0027; B65D 2501/0018; B29C 49/085; B29C 49/22; B29C 2949/0744; B29C 2949/074; B29C 2949/3026; B29C 2949/3024; B29C 49/64; B29L 2031/7158; B29K 2067/003
USPC ..... 215/12.2, 12.1, 385, 381, 44; 220/62.21, 220/62.12, 62.11, 676
See application file for complete search history.

(56) References Cited

FOREIGN PATENT DOCUMENTS

| | | |
|---|---|---|
| JP | 2005-047593 A | 2/2005 |
| JP | 2005-053513 A | 3/2005 |
| JP | 2014-046966 A | 3/2014 |
| JP | 2014-091537 A | 5/2014 |
| JP | 2017-178434 A | 10/2017 |
| JP | 2018-083657 A | 5/2018 |
| JP | 2018-188183 A | 11/2018 |
| JP | 2019-119476 A | 7/2019 |
| JP | 2019-202808 A | 11/2019 |
| WO | 2018-198533 A1 | 11/2018 |

OTHER PUBLICATIONS

Jun. 21, 2022 Office Action issued in Japanese Patent Application No. 2019-064660.
Nov. 8, 2022 Office Action issued in Japanese Patent Application No. 2019-064660.
Nov. 1, 2022 Office Action issued in Chinese Patent Application No. 202080024416.0.

PREFORM ASSEMBLY, DOUBLE CONTAINER, AND METHOD OF MANUFACTURING DOUBLE CONTAINER

This application is a divisional application of U.S. patent application Ser. No. 17/598,431 filed Sep. 27, 2021, which is the U.S. National Phase of PCT/JP2020/009504 filed Mar. 5, 2020, which claims priority to Japanese Patent Application No. 2019-064660 filed Mar. 28, 2019, the entire disclosures of which are incorporated herein by reference.

TECHNICAL FIELD

The present disclosure relates to a preform assembly, a double container, and a method of manufacturing a double container.

BACKGROUND

As a container for containing a food seasoning such as soy sauce, a beverage, cosmetics such as a skin lotion, or a toiletry such as a shampoo, a hair conditioner, or a liquid soap as a content liquid, a double container having a double structure is known. The double container having a double structure is manufactured by blow molding a preform assembly in which an inner preform is incorporated inside an outer preform, and includes: an outer layer body including a tubular outer mouth portion and a bottomed tubular barrel portion connected to the outer mouth portion via a shoulder portion; and an inner layer body including an inner mouth portion located on the inner side of the outer mouth portion and a volume-reduction deformable containing portion connected to the inner mouth portion and separably laminated on the inner surface of each of the shoulder portion and the barrel portion (for example, see PTL 1).

The foregoing double container is used, for example, as a squeeze-type discharge container combined with a discharge cap having a check valve, or a pump-type container combined with a pump. In this case, the content liquid can be discharged to the outside by squeezing (compressing) the barrel portion of the outer layer body or operating the pump. After discharging the content liquid, as a result of outside air being introduced between the outer layer body and the inner layer body from an outside air introduction port formed in the outer layer body, the outer layer body alone can be restored to the original shape while the containing portion of the inner layer body remains volume-reduction deformed. With this double container, the content liquid contained in the containing portion of the inner layer body can be discharged to the outside without replacing it with outside air, so that contact of the content liquid contained inside the inner layer body with outside air can be reduced and degradation, degeneration, and the like of the content liquid can be suppressed.

CITATION LIST

Patent Literature

PTL 1: JP 2017-178434 A

SUMMARY

Technical Problem

However, in the conventional double container formed by blow molding the preform assembly in which the inner preform is incorporated inside the outer preform, if the outside air introduction port for introducing outside air between the outer layer body and the inner layer body is formed in the mouth portion composed of the outer mouth portion and the inner mouth portion, an air passage from the outside air introduction port to between the shoulder portion and the containing portion cannot be secured appropriately. There is thus the possibility that, after the content liquid is discharged, outside air is not introduced between the barrel portion and the containing portion through the part between the shoulder portion and the containing portion, and the volume-reduction deformation of the containing portion is not maintained or the restoration of the outer layer body is hampered.

It could therefore be helpful to provide a preform assembly, a double container, and a method of manufacturing a double container that can reliably secure an air passage from an outside air introduction port formed in a mouth portion to between a barrel portion and a containing portion.

Solution to Problem

A preform assembly according to the present disclosure comprises: an outer preform that includes a tubular outer mouth portion and a stretch portion connected to the outer mouth portion and in which a recess or ridge extending in a vertical direction is provided on an inner surface of the stretch portion; and an inner preform that includes a tubular inner mouth portion and a stretch portion connected to the inner mouth portion, wherein an outside air introduction port communicating with a part between the outer preform and the inner preform is provided in a mouth portion composed of the outer mouth portion and the inner mouth portion located on an inner side of the outer mouth portion.

Preferably, in the preform assembly according to the present disclosure, the stretch portion in the outer preform has a diameter decrease portion in which an inner diameter gradually decreases downward from the outer mouth portion, and the recess or ridge is provided in the diameter decrease portion.

Preferably, in the preform assembly according to the present disclosure, the outside air introduction port is formed by a through hole passing through the outer mouth portion, and a ridge extending in the vertical direction is provided on an outer surface of the inner preform.

A double container according to the present disclosure comprises: an outer layer body that includes a tubular outer mouth portion and a bottomed tubular barrel portion connected to the outer mouth portion via a shoulder portion and in which a thin wall portion or thick wall portion extending in a vertical direction is provided in the shoulder portion; and an inner layer body that includes a tubular inner mouth portion and a volume-reduction deformable containing portion connected to the inner mouth portion and separably laminated on an inner surface of each of the shoulder portion and the barrel portion.

Preferably, in the double container according to the present disclosure, a rib extending in the vertical direction is provided in the shoulder portion in the outer layer body.

Preferably, in the double container according to the present disclosure, the outside air introduction port is formed by a through hole passing through the outer mouth portion, and a ridge extending in the vertical direction is provided on an outer surface of the inner mouth portion.

A method of manufacturing a double container according to the present disclosure comprises: a preform formation step of forming each of an outer preform that includes a tubular outer mouth portion and a stretch portion connected to the outer mouth portion and in which a recess or ridge extending in a vertical direction is provided on an inner surface of the stretch portion and an inner preform that includes a tubular inner mouth portion and a stretch portion connected to the inner mouth portion, and incorporating the inner preform inside the outer preform to form a preform assembly in which an outside air introduction port communicating with a part between the outer preform and the inner preform is provided in a mouth portion composed of the outer mouth portion and the inner mouth portion located on an inner side of the outer mouth portion; and a blow molding step of heating the preform assembly to a temperature at which stretching is possible and blow molding the preform assembly into a double container including: an outer layer body that includes the outer mouth portion and a bottomed tubular barrel portion connected to the outer mouth portion via a shoulder portion and in which a thin wall portion or thick wall portion extending in the vertical direction is provided in the shoulder portion; and an inner layer body that includes the inner mouth portion and a volume-reduction deformable containing portion connected to the inner mouth portion and separably laminated on an inner surface of each of the shoulder portion and the barrel portion, wherein an outside air introduction port communicating with a part between the outer layer body and the inner layer body is provided in a mouth portion composed of the outer mouth portion and the inner mouth portion located on the inner side of the outer mouth portion.

Preferably, in the method of manufacturing a double container according to the present disclosure, in the preform formation step, the preform assembly is formed using the inner preform in which a ridge extending in the vertical direction is provided on an outer surface thereof and the outer preform in which a through hole for forming the outside air introduction port is provided in the outer mouth portion.

Preferably, in the method of manufacturing a double container according to the present disclosure, in the blow molding step, a mold in which a ridge or recess extending in the vertical direction is provided on a cavity formation surface thereof is used to form the double container in which a rib corresponding to the ridge or recess on the cavity formation surface is formed in the shoulder portion of the outer layer body.

Advantageous Effect

It is thus possible to provide a preform assembly, a double container, and a method of manufacturing a double container that can reliably secure an air passage from an outside air introduction port formed in a mouth portion to between a barrel portion and a containing portion.

BRIEF DESCRIPTION OF THE DRAWINGS

In the accompanying drawings.

DETAILED DESCRIPTION

One of the disclosed embodiments will be described below, with reference to the drawings.

Figure 1:
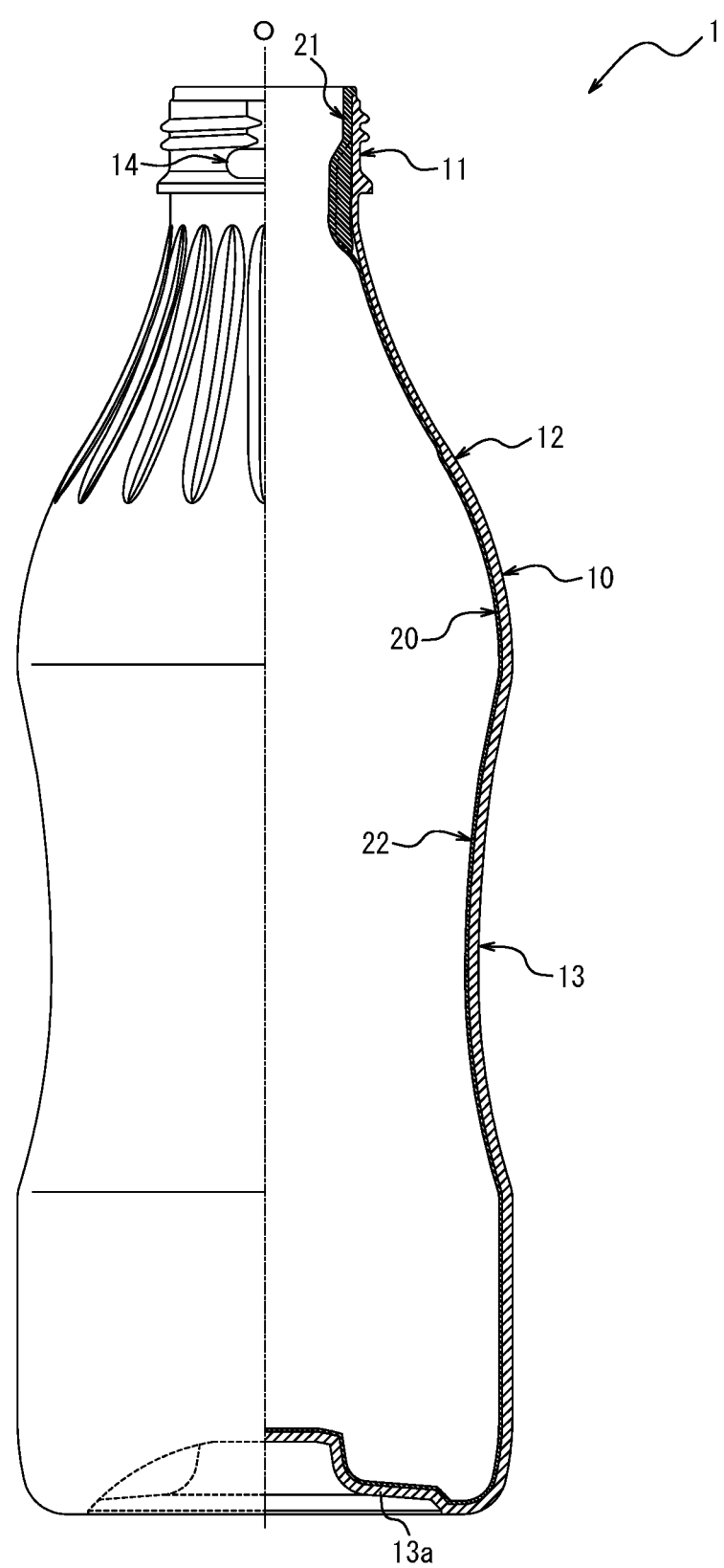
FIG. 1 is a half sectional view of a double container according to one of the disclosed embodiments.

A double container 1 according to one of the disclosed embodiments illustrated in FIG. 1 is a synthetic resin-made container called a delamination container, and has a double structure including an outer layer body 10 and an inner layer body 20. The double container 1 can be formed by subjecting a preform assembly 40 (a preform assembly according to one of the disclosed embodiments) illustrated in FIG. 5 to biaxial stretching blow molding. An example in which the double container 1 is used as a squeeze-type discharge container for containing a liquid such as cosmetics or a food seasoning as contents will be described below.

The outer layer body 10 is a part constituting an outer shell of the double container 1, and has a bottle shape including an outer mouth portion 11, a shoulder portion 12, and a barrel portion 13.

Figure 2:
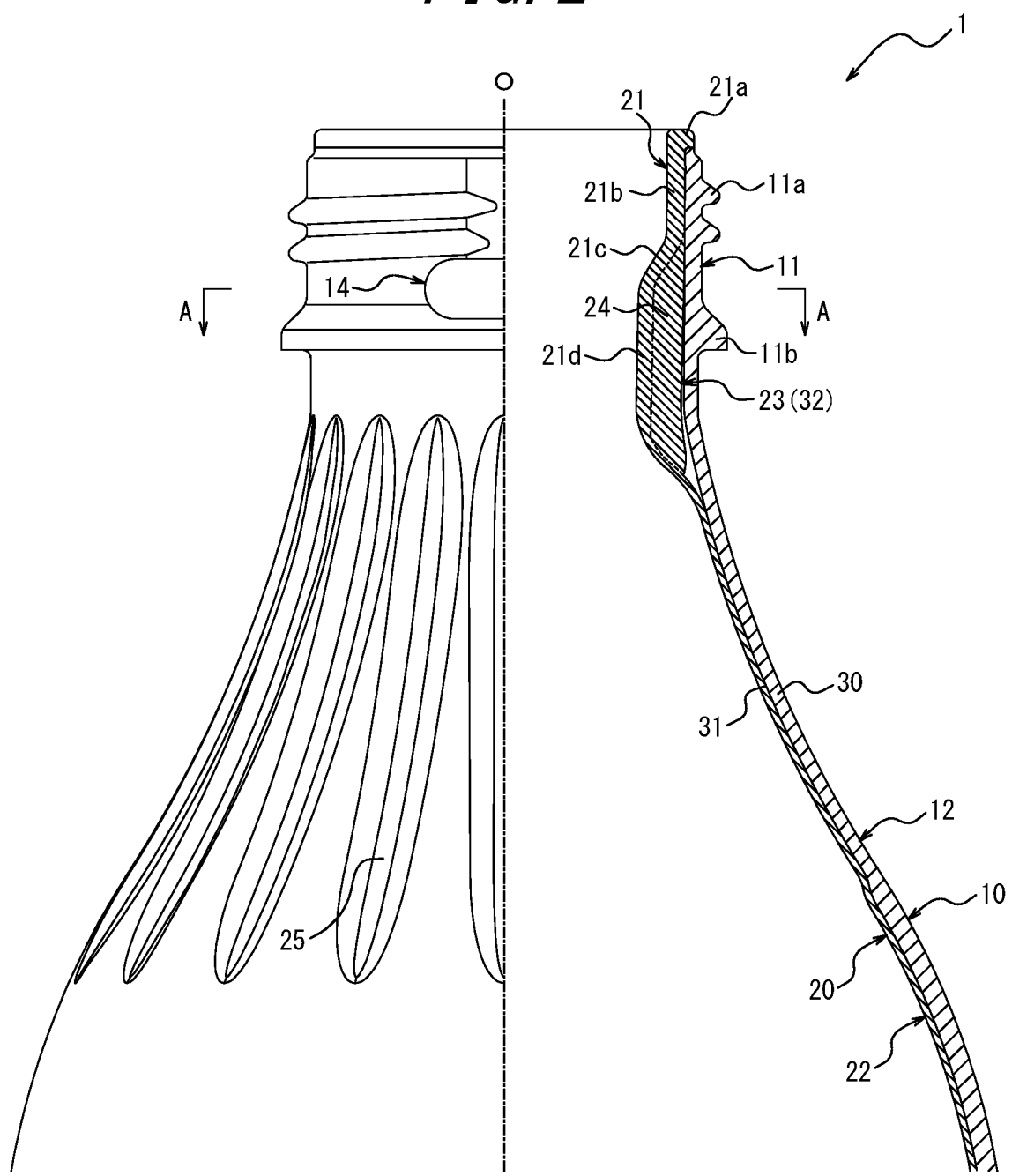
FIG. 2 is a half sectional view illustrating main parts of the double container illustrated in FIG. 1.
Figure 4:
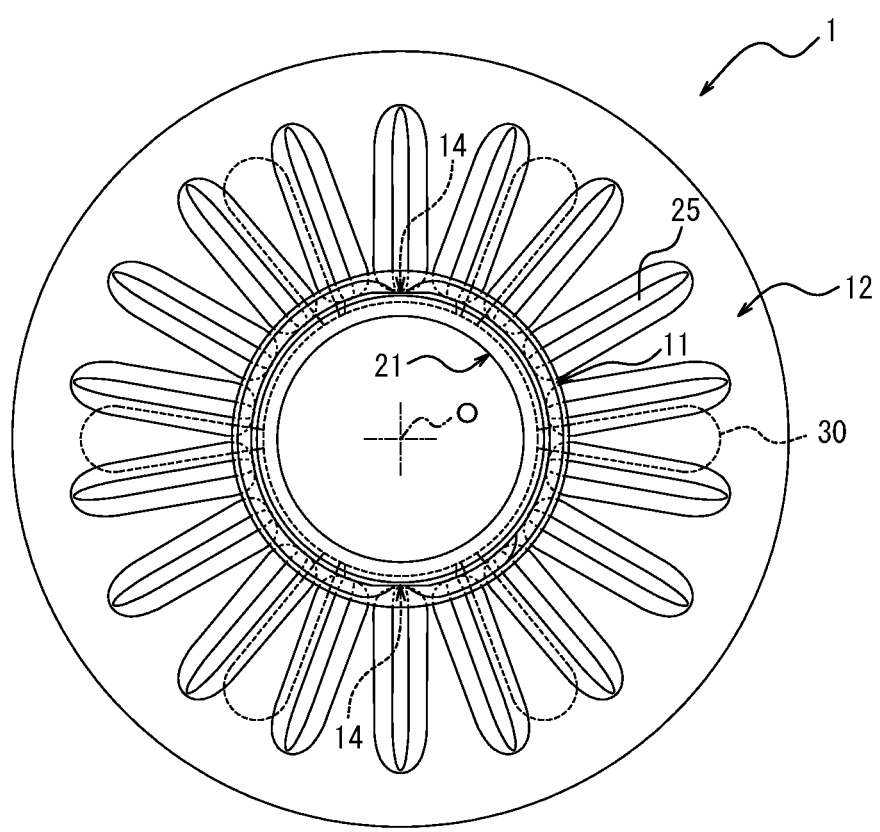
FIG. 4 is a top view of the double container illustrated in FIG. 1.

The outer mouth portion 11 is cylindrical about a center axis O, as illustrated in FIG. 4. A male screw 11a is integrally provided on the outer circumferential surface of the outer mouth portion 11, as illustrated in FIG. 2. A discharge cap (not illustrated) having a discharge port can be attached to the outer mouth portion 11 by screw connection to the male screw 11a.

Herein, the term "vertical direction" (up-down direction) denotes a direction along the central axis O, the term "upward" denotes a direction from the barrel portion 13 to the outer mouth portion 11, and the term "downward" denotes a direction opposite to the upward direction. The term "radial direction" denotes a direction orthogonal to the center axis O, and the term "circumferential direction" denotes a direction around the center axis O. The term "longitudinal section" denotes a section including the central axis O, and the term "cross section" denotes a section perpendicular to the central axis O.

The outer mouth portion 11 may include an annular protrusion instead of the male screw 11a, so that a discharge cap can be attached to the outer mouth portion 11 by undercut engagement through capping.

The outer mouth portion 11 has a pair of outside air introduction ports 14. The pair of outside air introduction ports 14 are located symmetrically with each other on both sides of the axial center of the outer mouth portion 11. Each outside air introduction port 14 has a long hole shape extending in the circumferential direction, and passes through the outer mouth portion 11 in the radial direction. That is, the outside air introduction port 14 is formed by a through hole passing through the outer mouth portion 11. The outside air introduction port 14 communicates with the part between the outer layer body 10 and the inner layer body 20, and outside air can be introduced between the outer layer body 10 and the inner layer body 20 through the outside air introduction port 14. The outside air introduction port 14 is not limited to a long hole shape, and may be designed as appropriate. For example, the outside air introduction port 14 may have a perfect circle shape.

A neck ring 11b is integrally provided on the outer circumferential surface of the outer mouth portion 11 on the side closer to the shoulder portion 12 than the outside air introduction port 14. The neck ring 11b has a flange shape extending on the whole circumference of the outer mouth portion 11, and projects radially outward from the outer circumferential surface of the outer mouth portion 11. The neck ring 11b is located a little higher than the lower end of the outer mouth portion 11. In detail, in this embodiment, a cylindrical non-stretch portion that is substantially not stretched during biaxial stretching blow molding is provided directly below the neck ring 11b. This non-stretch portion forms the lower end of the outer mouth portion 11. As a result of the non-stretch portion being provided directly below the neck ring 11b, the neck ring 51b can be kept from being affected by stretching. Instead of providing such a non-stretch portion, the neck ring 11b may form the lower end of the outer mouth portion 11.

The shoulder portion 12 integrally connects to the lower end of the outer mouth portion 11, and projects radially outward over the outer mouth portion 11. In this embodiment, the longitudinal sectional shape of the shoulder portion 12 is a curved shape in which the upper part projects to the inside of the container and the lower part projects to the outside of the container. Alternatively, the longitudinal sectional shape of the shoulder portion 12 may be a curved shape in which the whole part projects to the outside of the container.

The barrel portion 13 has a bottomed cylindrical shape, and integrally connects to the lower end of the shoulder portion 12 at its upper end, as illustrated in FIG. 1. That is, the barrel portion 13 connects to the outer mouth portion 11 via the shoulder portion 12. The cross sectional shape of the barrel portion 13 may be circular, oval, or approximately rectangular.

The barrel portion 13 is flexible, and can elastically deform and dent when squeezed (compressed) and, by the elastic force, return to the original shape from the dented state by itself. As a result of the barrel portion 13 being configured to be elastically deformable by squeezing, in the case where the double container 1 is used as a squeeze-type discharge container, the content liquid discharge operation can be performed easily. Moreover, after the discharge of the content liquid, the outer layer body 10 easily returns to the original shape, thus ensuring that outside air is introduced between the outer layer body 10 and the inner layer body 20 through the outside air introduction port 14. Hence, the double container 1 can reliably achieve its functions.

A bottom part 13a at the lower end of the barrel portion 13 has a shape of being depressed on the inner side of the annular outer circumferential edge. By grounding the bottom part 13a, the double container 1 can be placed in an upright position.

In this embodiment, the outer layer body 10 is made of polyethylene terephthalate (PET). As a result of the outer layer body 10 being made of polyethylene terephthalate, the double container 1 can be a lightweight and highly transparent container.

The material of the outer layer body 10 is not limited to polyethylene terephthalate, and may be other synthetic resin material such as polyester resin, polyolefin resin, nylon resin, polycarbonate resin (PC resin), cycloolefin copolymer resin (COC resin), or cycloolefin polymer resin (COP resin).

The inner layer body 20 includes an inner mouth portion 21 and a containing portion 22 integrally connected to the lower end of the inner mouth portion 21.

As illustrated in FIG. 2, the inner mouth portion 21 has a stepped cylindrical shape, and is located on the inner side of the outer mouth portion 11 coaxially with the outer mouth portion 11. The inner mouth portion 21 has an annular flange 21a placed on the upper end of the outer mouth portion 11, a cylindrical upper tube 21b vertically suspended from the inner peripheral edge of the flange 21a and in contact with the inner surface of the outer mouth portion 11, a conical inclined tube 21c that decreases in diameter downward from the lower end of the upper tube 21b, and a cylindrical lower tube 21d vertically suspended from the lower end of the inclined tube 21c. The upper end of the inclined tube 21c is located higher than the upper end of the pair of outside air introduction ports 13. A gap 23 of predetermined spacing is formed between the inner circumferential surface of the outer mouth portion 11 and the outer circumferential surface of the lower tube 21d.

As a result of the outer circumferential surface of the upper tube 21b abutting the inner circumferential surface of the outer mouth portion 11 on the whole circumference, the gap 23 between the outer mouth portion 11 and the lower tube 21d is blocked from the outside at the upper end of the outer mouth portion 11 or the inner mouth portion 21. As a result of the flange 21a abutting the upper end of the outer mouth portion 11, the inner mouth portion 21 is positioned relative to the outer mouth portion 11 in the vertical direction.

As illustrated in FIG. 1, the containing portion 22 has a bag shape thinner than the barrel portion 13. The containing portion 22 connects to the lower end of the lower tube 21d of the inner mouth portion 21, and extends along the inner surface of each of the shoulder portion 12 and the barrel portion 13. The inside of the containing portion 22 is a space for containing the content liquid. The containing portion 22 can be filled with the content liquid through the inner mouth portion 21, and the content liquid contained in the containing portion 22 can be discharged to the outside through the inner mouth portion 21. The containing portion 22 can be volume-reduction deformed (deformed so as to reduce the inner volume) while separating from the inner surface of the barrel portion 13, with the discharge of the content liquid. Here, outside air is introduced between the outer layer body 10 and the inner layer body 20 from the outside air introduction port 14, as a result of which the barrel portion 13 alone returns to the original shape and the containing portion 22 separates from the inner surface of the barrel portion 13 and is volume-reduction deformed. Herein, the term "separation" covers not only the case where the outer layer body 10 and the inner layer body 20 separate from each other from an adhesion state or a pseudo adhesion state involving almost no adhesive force but also the case where the outer layer body 10 and the inner layer body 20 separate from each other from a close contact state involving no adhesive force.

In this embodiment, the inner layer body 20 is made of polyethylene terephthalate. As a result of the inner layer body 20 being made of polyethylene terephthalate, the double container 1 can be a lightweight and highly transparent container.

The material of the inner layer body 20 is not limited to polyethylene terephthalate, and may be other synthetic resin material such as polyester resin, polyolefin resin, nylon resin, polycarbonate resin (PC resin), cycloolefin copolymer resin (COC resin), cycloolefin polymer resin (COP resin), or ethylene-vinyl alcohol copolymer resin (EVOH resin). In the case where ethylene-vinyl alcohol copolymer resin is used as the material of the inner layer body 20, an ethylene-vinyl alcohol copolymer resin having appropriate ethylene content may be employed in view of barrier property and flexibility. The inner layer body 20 may have, for example, a multilayer structure in which a barrier layer such as an MX nylon resin layer is provided between a pair of polyethylene terephthalate layers, to ensure barrier property.

To easily secure an air passage for outside air from the outside air introduction port 14 to between the barrel portion 13 and the containing portion 22, a plurality of ridges (projections) 24 extending in the vertical direction are integrally provided on the outer surface of the inner mouth portion 21.

Figure 3:
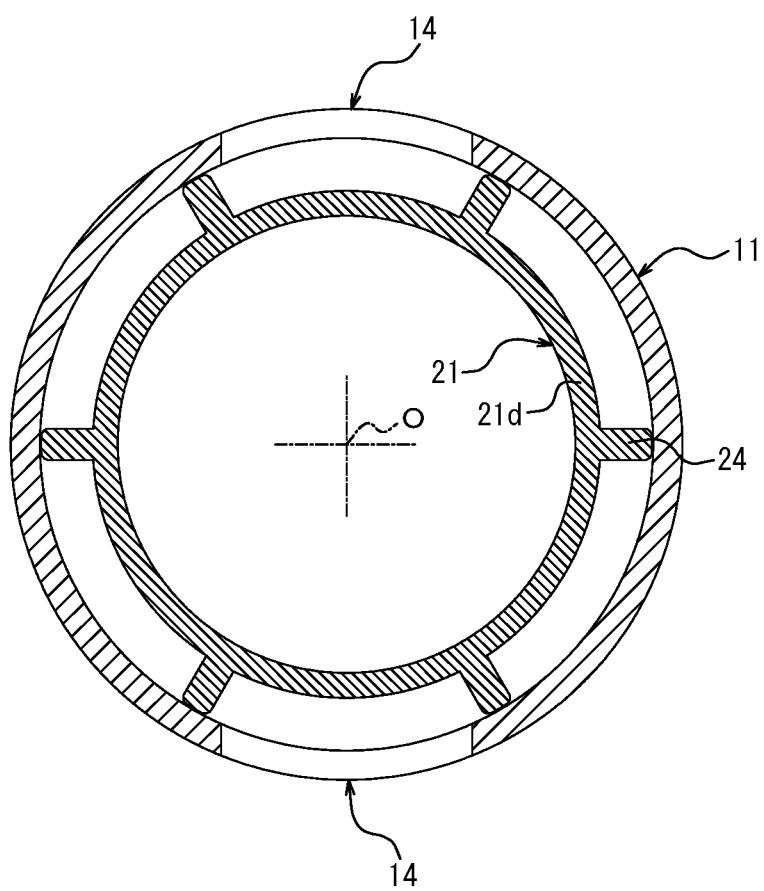
FIG. 3 is a sectional view along line A-A in FIG. 2.

In this embodiment, six platelike ridges 24 are arranged with equal spacing in the circumferential direction on the outer surface of the lower tube 21d, as illustrated in FIG. 3. The six ridges 24 are arranged so as not to overlap the pair of outside air introduction ports 14. Alternatively, the six ridges 24 may be arranged so as to overlap the pair of outside air introduction ports 14. The number of ridges 24 is not limited to six, and may be changed as appropriate. In FIG. 3, only one ridge 24 is given the reference sign for convenience's sake.

Each ridge 24 projects radially outward from the outer surface of the inner layer body 20, and extends in the vertical direction from the inner mouth portion 21 to the containing portion 22. That is, each ridge 24 extends from the height position corresponding to the outside air introduction port 14 over the neck ring 11b and reaches the shoulder portion 12. At the shoulder portion 12, the projection height of each ridge 24 from the outer surface of the inner layer body 20 decreases gradually. The radially outward projection end of each ridge 24 has a slightly rounded shape.

To easily secure an air passage for outside air from the outside air introduction port 14 to between the barrel portion 13 and the containing portion 22, a plurality of ribs 25 extending in the vertical direction are provided on the shoulder portion 12 in the outer layer body 10, as illustrated in FIGS. 2 and 4. In FIGS. 2 and 4, etc., only one rib 25 is given the reference sign for convenience's sake.

In this embodiment, eighteen ribs 25 are arranged with equal spacing in the circumferential direction in the shoulder portion 12 in the outer layer body 10. Each rib 25 extends from the upper end of the shoulder portion 12 to a vertical intermediate part of the shoulder portion 12, and extends in the radial direction in a top view. The number of ribs 25 and the arrangement of the ribs 25 are not limited to such, and may be changed as appropriate. Each rib 25 is a concave rib formed as a result of the shoulder portion 12 being curved to locally project toward the inside of the container so as to be concave when viewed from the outside of the container. Each rib 25 may be a convex rib formed as a result of the shoulder portion 12 being curved to locally project toward the outside of the container so as to be convex when viewed from the outside of the container. Thus, each rib 25 is a part formed as a result of the shoulder portion 12 being curved to locally project toward the inside of the container or the outside of the container. Each rib 25 has a U cross sectional shape that gradually decreases in width in the radially inward direction, substantially over the entire length. The inner layer body 20 is stretched by biaxial stretching blow molding so as to extend along the shape of the rib 25.

To reliably secure an air passage for outside air from the outside air introduction port 14 to between the barrel portion 13 and the containing portion 22, a plurality of thin wall portions 30 each extending in the vertical direction are provided in the shoulder portion 12 in the outer layer body 10, as illustrated in FIG. 4. In FIG. 4, only one thin wall portion 30 is given the reference sign for convenience's sake.

In this embodiment, six thin wall portions 30 are arranged with equal spacing in the circumferential direction in the shoulder portion 12 in the outer layer body 10. Each thin wall portion 30 extends from the vicinity of the upper end of the shoulder portion 12 to a vertical intermediate part of the shoulder portion 12. The number of thin wall portions 30 and the arrangement of the thin wall portions 30 may be changed as appropriate. Each thin wall portion 30 is formed by a depression 31 provided on the inner surface of the shoulder portion 12 as a slight recess so as to reduce the thickness of the shoulder portion 12 and having, in a top view, an approximately triangular shape that increases in circumferential width in the radially outward direction. The reason why each thin wall portion 30 has such approximately triangular shape is as follows: Because the shoulder portion 12 including the thin wall portions 30 is shaped to increase in diameter downward, a lower part (i.e. closer to the radial outer side) of the thin wall portion 30 has a greater stretching amount in the circumferential direction. The six thin wall portions 30 are arranged so as not to overlap the part directly below the pair of outside air introduction ports 14. Alternatively, the six thin wall portions 30 may be arranged so as to overlap the part directly below the pair of outside air introduction ports 14.

The double container 1 having such a structure can form a squeeze container when a discharge cap is attached to the outer mouth portion 11. The discharge cap in this case may have, for example, a structure including an outside air check valve for allowing outside air to be introduced into the outside air introduction port 14 and preventing outside air from flowing outside from the outside air introduction port 14 and a content liquid check valve for allowing the content liquid to be discharged and preventing backward flow of outside air into the containing portion 22.

In the double container 1 formed as a squeeze container, when the barrel portion 13 of the outer layer body 10 is squeezed (compressed), the containing portion 22 volume-reduction deforms, and the content liquid is pushed out of the discharge cap and discharged to the outside. When the squeeze is released after the content liquid is discharged, the barrel portion 13 returns to the original shape, and consequently the containing portion 22 of the inner layer body 20 separates from the inner surface of the outer layer body 10 and outside air is introduced between the outer layer body 10 and the inner layer body 20 from the outside air introduction port 14. Thus, only the barrel portion 13 returns to the original shape while the containing portion 22 remains volume-reduction deformed. In this way, the content liquid contained in the containing portion 22 can be discharged without replacing it with outside air, so that contact of the content liquid contained in the containing portion 22 with outside air can be reduced and degradation and degeneration of the content liquid can be suppressed.

In the double container 1 according to this embodiment, the plurality of thin wall portions 30 each extending in the vertical direction are arranged with spacing in the circumferential direction in the shoulder portion 12. The thickness deviation in the circumferential direction as a result of the thin wall portions 30 and the thick wall portions alternating in the circumferential direction creates a difference in the separation strength. Hence, when the squeezed barrel portion 13 returns to the original shape, the containing portion 22 can be reliably separated from the inner surface of the outer layer body 10 at the shoulder portion 12. With this separation, the air passage for outside air from the outside air introduction port 14 to between the barrel portion 13 and the containing portion 22 can be reliably secured. In addition, when the squeezed barrel portion 13 returns to the original shape, outside air can be reliably introduced between the barrel portion 13 and the containing portion 22 from the outside air introduction port 14 formed in the outer mouth portion 11. Hence, the containing portion 22 can be reliably volume-reduction deformed while separating from the inner surface of the outer layer body 10, with the discharge of the content liquid. Since the containing portion 22 can be reliably volume-reduction deformed with the discharge of the content liquid, introduction of outside air into the containing portion 22 can be reliably prevented.

Moreover, in this embodiment, the plurality of ridges 24 each extending in the vertical direction are arranged with spacing in the circumferential direction on the outer surface of the inner mouth portion 21. This can create an air passage 32 extending from the outside air introduction port 14 over the bent portion between the outer mouth portion 11 and the shoulder portion 12 (the bent portion between the inner mouth portion 21 and the containing portion 22) to the part between the shoulder portion 12 and the containing portion 22, between the outer layer body 10 and the inner layer body 20. Hence, when the squeezed barrel portion 13 returns to the original shape, outside air introduced from the outside air introduction port 14 into the part between the outer mouth portion 11 and the inner mouth portion 21 can be more reliably guided through the air passage 32 over the bent portion between the outer mouth portion 11 and the shoulder portion 12 to the part between the shoulder portion 12 and the containing portion 22.

Moreover, in this embodiment, the plurality of ribs 25 each extending in the vertical direction are arranged with spacing in the circumferential direction in the shoulder portion 12. Accordingly, at each rib 25 in the shoulder portion 12, the containing portion 22 that has been separated from the inner surface of the outer layer body 10 can be kept from coming into close contact with the inner surface of the outer layer body 10 again, so that the air passage in the shoulder portion 12 can be secured more reliably.

Figure 5:
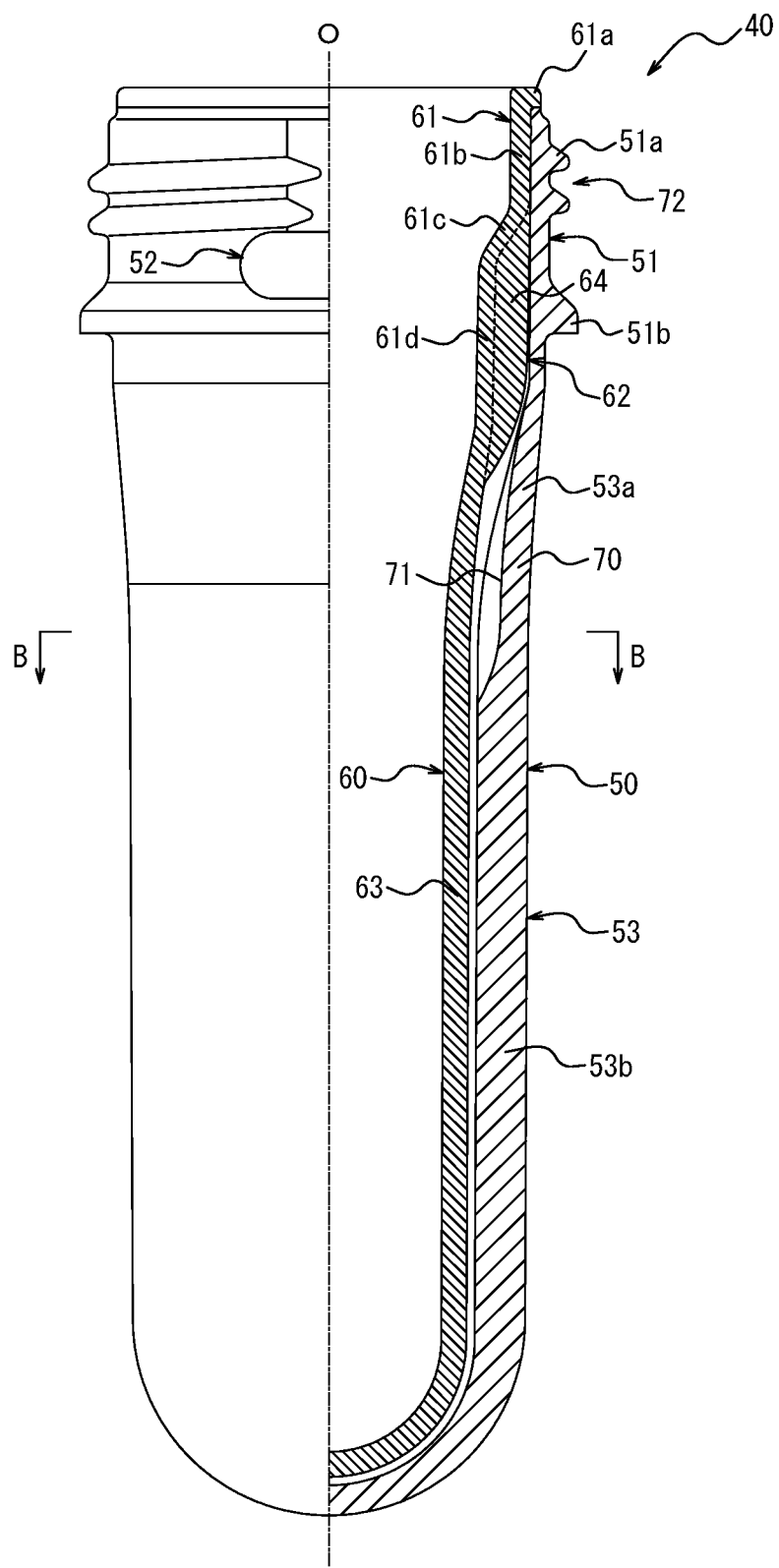
FIG. 5 is a half sectional view of a preform assembly that is blow molded into the double container illustrated in FIG. 1.

As illustrated in FIG. 5, the preform assembly 40 has a double structure in which a synthetic resin-made inner preform 60 for forming the inner layer body 20 is incorporated inside a synthetic resin-made outer preform 50 for forming the outer layer body 10.

The outer preform 50 is formed in a predetermined shape corresponding to the outer layer body 10 by injection molding the same synthetic resin material as the outer layer body 10 using a mold. In this embodiment, the outer preform 50 is made of polyethylene terephthalate, as with the outer layer body 10.

The outer preform 50 has an outer mouth portion 51 of the same shape as the outer mouth portion 11 of the outer layer body 10. That is, the outer mouth portion 51 has a cylindrical shape, a male screw 51a is integrally provided on the outer circumferential surface of the outer mouth portion 51, and a pair of outside air introduction ports 52 each of which has a long hole shape extending in the circumferential direction and passes through the outer mouth portion 51 in the radial direction are formed on both sides of the axial center of the outer mouth portion 51 symmetrically with each other. Moreover, an approximately test tube-shaped stretch portion 53 having a semispherical bottom part is integrally provided at the lower end of the outer mouth portion 51. The stretch portion 53 is thicker than the outer mouth portion 51. A neck ring 51b having a flange shape is integrally provided at the outer mouth portion 51.

The inner preform 60 is formed in a predetermined shape corresponding to the inner layer body 20 by injection molding the same synthetic resin material as the inner layer body 20 using a mold. In this embodiment, the inner preform 60 is made of polyethylene terephthalate, as with the inner layer body 20.

The inner preform 60 includes an inner mouth portion 61 of the same shape as the inner mouth portion 21 of the inner layer body 20. In detail, the inner mouth portion 61 has a stepped cylindrical shape, and is located on the inner side of the outer mouth portion 51 coaxially with the outer mouth portion 51. The inner mouth portion 61 has an annular flange 61a placed on the upper end of the outer mouth portion 51, a cylindrical upper tube 61b vertically suspended from the inner peripheral edge of the flange 61a and in contact with the inner surface of the outer mouth portion 51, a conical inclined tube 61c that decreases in diameter downward from the lower end of the upper tube 61b, and a cylindrical lower tube 61d vertically suspended from the lower end of the inclined tube 61c. As a result of the outer circumferential surface of the upper tube 61b abutting the inner circumferential surface of the outer mouth portion 51 on the whole circumference, the upper end part of the gap 62 between the outer mouth portion 51 and the lower tube 61d is blocked from the outside. As a result of the flange 61a abutting the upper end of the outer mouth portion 51, the inner mouth portion 61 is positioned relative to the outer mouth portion 51 in the vertical direction. An approximately test tube-shaped stretch portion 63 having a semispherical bottom part is integrally provided at the lower end of the inner mouth portion 61. The outer diameter of the stretch portion 63 is smaller than the outer diameter of the inner mouth portion 61. A gap is formed between the outer circumferential surface of the stretch portion 63 and the inner circumferential surface of the stretch portion 53, to prevent damage to the outer circumferential surface of the stretch portion 63 and the inner circumferential surface of the stretch portion 53 when incorporating the inner preform 60 inside the outer preform 50.

A plurality of ridges 64 corresponding to the plurality of ridges 24 are provided on the outer surface of the inner preform 60. In detail, six platelike ridges 64 each extending in the vertical direction are arranged with equal spacing in the circumferential direction on the outer surface of the lower tube 21d in the inner preform 60. Each ridge 64 projects radially outward from the outer surface of the inner preform 60, and extends in the vertical direction from the inner mouth portion 61 to the stretch portion 63. That is, each ridge 64 extends from the height position corresponding to the outside air introduction port 52 over the neck ring 51b and reaches the stretch portion 63. At the stretch portion 63, the projection height of each ridge 64 from the outer surface of the inner preform 60 decreases gradually. The upper end of each ridge 64 reaches the inclined tube 61c and connects to the inclined tube 61c. The plurality of ridges 64 are basically in the same shape as the ridges 24 of the inner layer body 20, but differ from the ridges 24 in that the part extending to the stretch portion 63 extends downward along the stretch portion 63 instead of extending radially outward.

A plurality of thin wall portions 70 for forming the plurality of thin wall portions 30 are provided in the outer preform 50. Each thin wall portion 70 has a constant width (circumferential length) in the intermediate part other than the upper end and the lower end. The width of each thin wall portion 70 is not limited to such, and may change in the vertical direction in the intermediate part. The shape of each thin wall portion 30 formed by stretching the corresponding thin wall portion 70 is therefore not limited to the foregoing approximately triangular shape. The plurality of thin wall portions 70 are formed by a plurality of recesses (grooves) 71 provided on the inner surface of the outer preform 50. That is, the plurality of recesses 71 are used to form the plurality of the depressions 31. The stretch portion 53 of the outer preform 50 has a diameter decrease portion 53a in which the inner diameter gradually decreases downward from the outer mouth portion 51. The plurality of thin wall portions 70 and the plurality of recesses 71 are provided in the diameter decrease portion 53a. The diameter decrease portion 53a connects to the lower end of the outer mouth portion 51, and forms the upper end of the stretch portion 53. The diameter decrease portion 53a is, however, not limited to such, and may be provided in a part of the stretch portion 53 other than the upper end. Each recess 71 extends in the vertical direction so as to form a thin wall portion 70 extending in the vertical direction. Each recess 71 extends downward from the vicinity of the upper end of the diameter decrease portion 53a while gradually increasing in depth, passes the lower end of the diameter decrease portion 53a and then gradually decreases in depth, and terminates. A bottomed cylindrical stretch portion main body 53b integrally connects to the lower end of the diameter decrease portion 53a, and the lower end of each recess 71 is located in an upper part of the stretch portion main body 53b. Alternatively, the lower end of each recess 71 may be located lower than the upper part of the stretch portion main body 53b, or located higher than the upper part of the stretch portion main body 53b. The upper end of each recess 71 may be located higher than the upper end of the diameter decrease portion 53a, or located lower than the upper end of the diameter decrease portion 53a.

Figure 6:
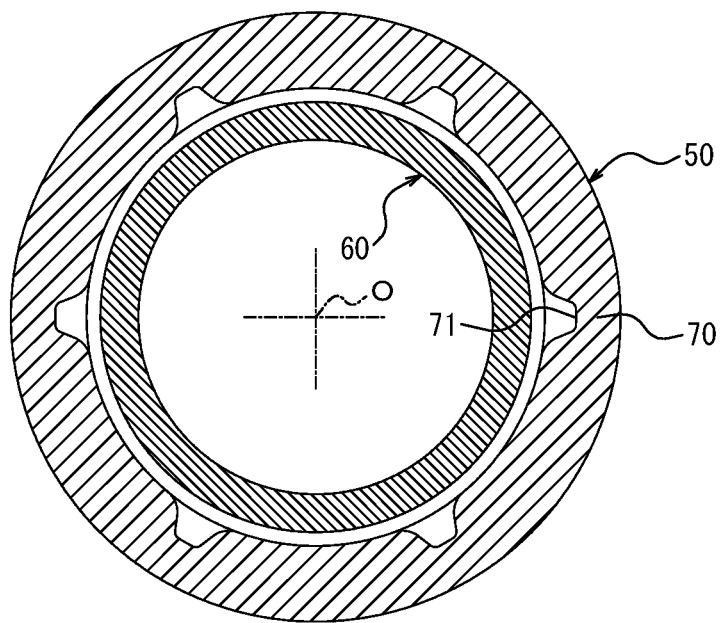
FIG. 6 is a sectional view along line B-B in FIG. 5.

As illustrated in FIG. 6, six recesses 71 are arranged with equal spacing in the circumferential direction on the inner surface of the outer preform 50. Hence, six thin wall portions 70 are arranged with equal spacing in the circumferential direction in the outer preform 50. In FIG. 6, only one recess 71 and one thin wall portion 70 are given the respective reference signs. Each recess 71 has an approximately inverted isosceles trapezoid shape in cross section. The cross sectional shape of each recess 71 is not limited to such, and other examples include an approximately inverted isosceles triangular shape, an approximately square shape, an approximately rectangular shape, an approximately semicircular shape, and an approximately semielliptical shape.

A mouth portion 72 composed of the outer mouth portion 51 and the inner mouth portion 61 located on the inner side of the outer mouth portion 51 is provided with the outside air introduction ports 52 communicating with the part between the outer preform 50 and the inner preform 60.

The double container 1 illustrated in FIG. 1 can be manufactured, for example, in the following manner (a method of manufacturing a double container according to one of the disclosed embodiments).

The method of manufacturing a double container according to this embodiment includes a preform formation step and a blow molding step. The method of manufacturing a double container according to this embodiment can also be used in the case of manufacturing a double container other than the double container 1 illustrated in FIG. 1.

In the preform formation step, first, the outer preform 50 and the inner preform 60 are each formed. The outer preform 50 includes the cylindrical outer mouth portion 51 and the stretch portion 53 connected to the outer mouth portion 51, the recesses 71 each extending in the vertical direction and forming the thin wall portion 70 are provided on the inner surface of the stretch portion 53, and the through holes each for forming the outside air introduction port 52 are provided in the outer mouth portion 51, as described above. The inner preform 60 includes the cylindrical inner mouth portion 61 and the stretch portion 63 connected to the inner mouth portion 61, and has the ridges 64 each extending in the vertical direction on the outer surface, as described above. The inner preform 60 is then incorporated inside the outer preform 50, to form the preform assembly 40 in which the outside air introduction port 52 communicating with the part between the outer preform 50 and the inner preform 60 is provided in the mouth portion 72 composed of the outer mouth portion 51 and the inner mouth portion 61 located on the inner side of the outer mouth portion 51.

Figure 7:
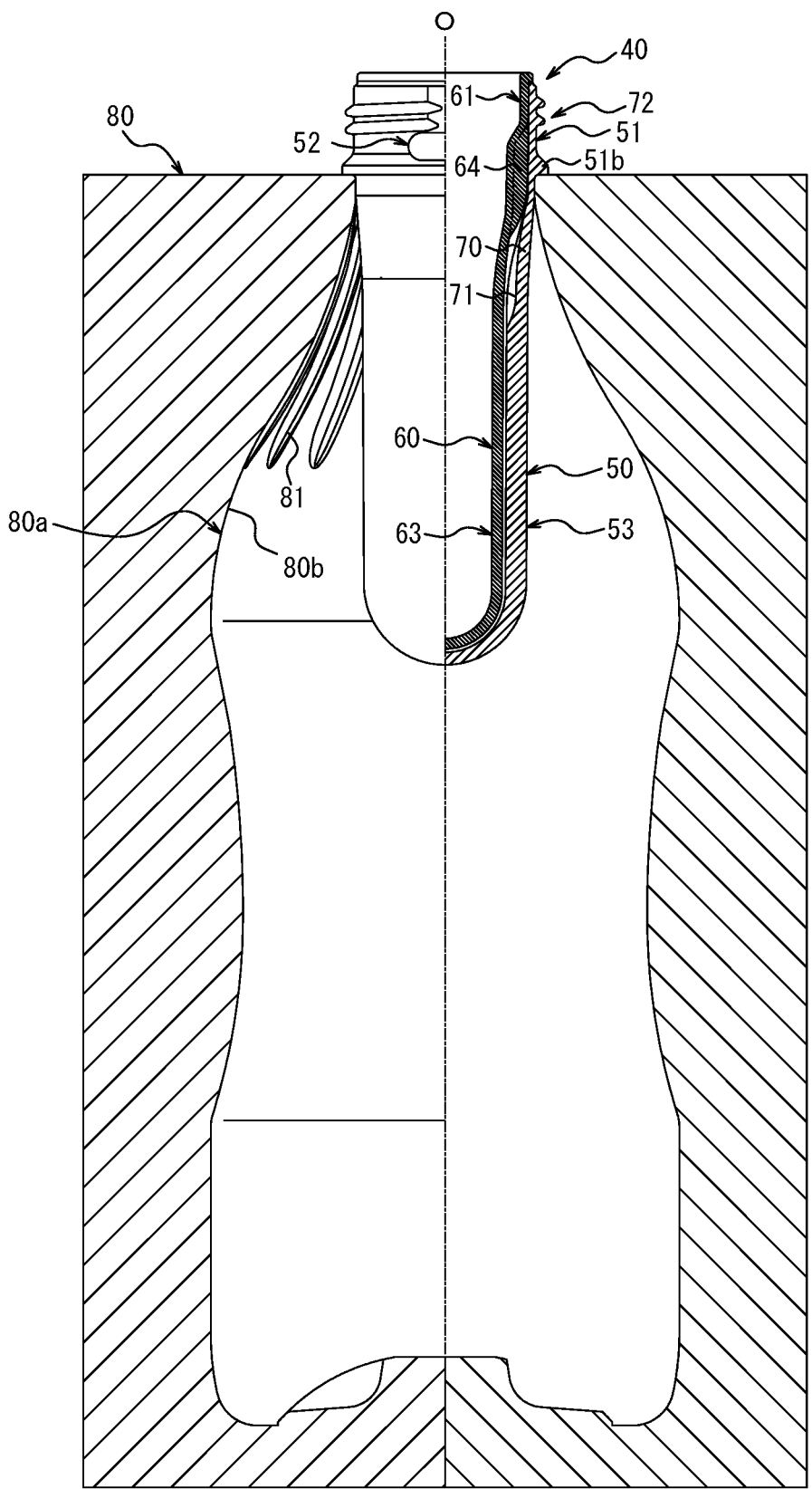
FIG. 7 is a sectional view illustrating a state in which the preform assembly illustrated in FIG. 5 is placed in a mold for blow molding.
Figure 8:
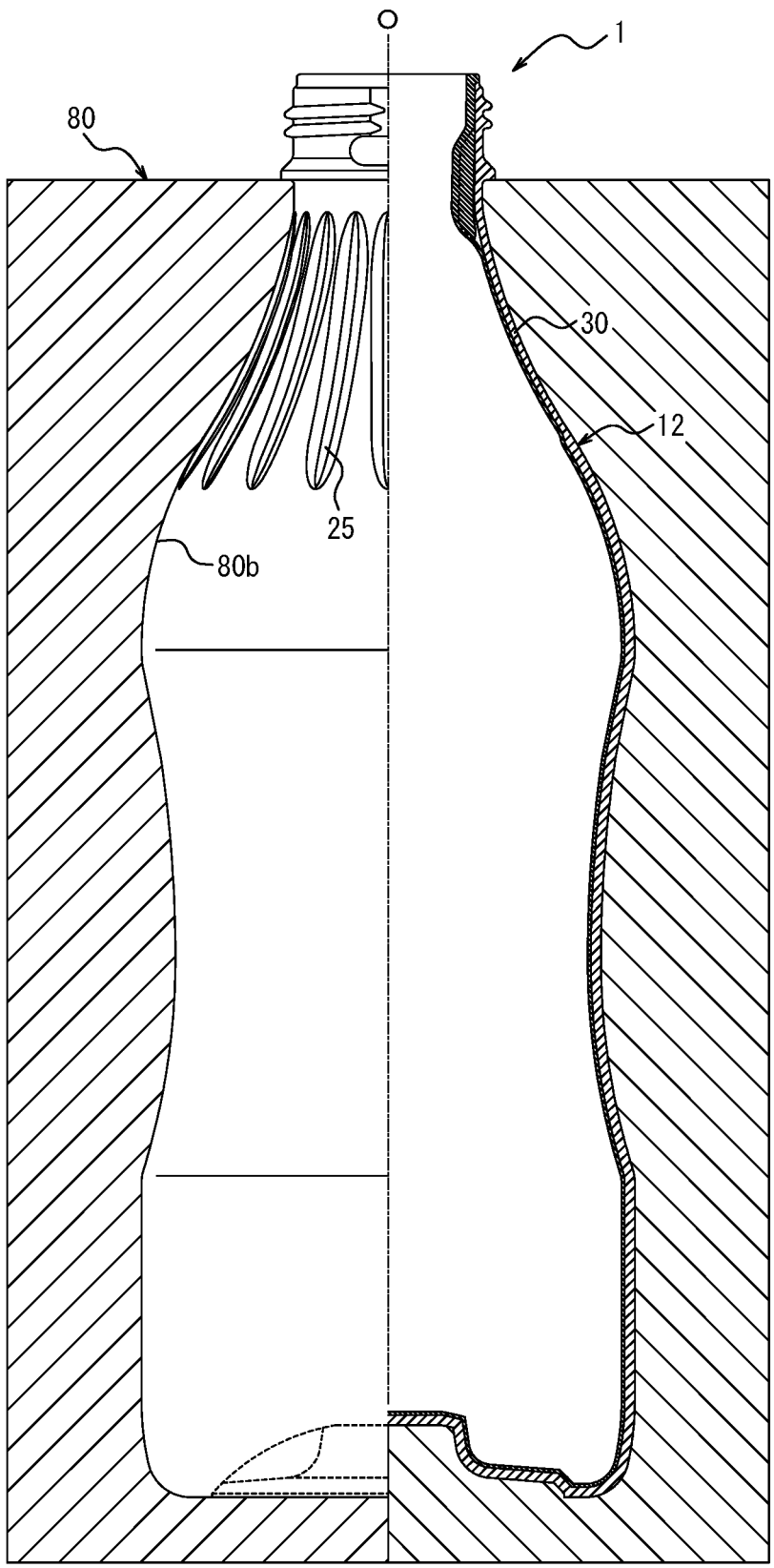
FIG. 8 is a sectional view illustrating a state in which the preform assembly is molded into a double container by biaxial stretching blow molding from the state illustrated in FIG. 7.

After the preform formation step ends, the blow molding step is performed. In the blow molding step, first, the preform assembly 40 heated to a temperature at which stretching is possible is set in a mold 80 for blow molding so that the outer mouth portion 51 and the inner mouth portion 61 will project from a cavity 80a, the neck ring 51b will be supported by the upper surface of the mold 80, and the stretch portions 53 and 63 will be located inside the cavity 80a. A plurality of ridges 81 each extending in the vertical direction and having a shape corresponding to the outer surface shape of the rib 25 are provided on the cavity formation surface 80b of the mold 80. In FIG. 7, only one ridge 81 is given the reference sign. In this state in which the preform assembly 40 is set, a pressurized medium such as pressurized air or a pressurized liquid is fed from a feeder (not illustrated) into the preform assembly 40. The stretch portions 53 and 63 of the preform assembly 40 are thus biaxial stretching blow molded into the shapes along the inner surface of the cavity formation surface 80b, as illustrated in FIG. 8. The double container 1 can thus be formed.

Biaxial stretching blow molding the preform assembly 40 in this way can yield the double container 1 having the plurality of thin wall portions 30 formed as a result of stretching the plurality of thin wall portions 70 in the preform assembly 40. In this embodiment, the plurality of thin wall portions are formed by the recesses 71 provided not on the outer surface of the outer preform 50 but on the inner surface of the outer preform 50, so that favorable moldability of the outer surface of the shoulder portion 12 in the double container 1 can be maintained.

In this embodiment, the mold 80 having the ridges 81 described above is used in the biaxial stretching blow molding, and therefore the double container 1 having the plurality of ribs 25 can be molded. In the case where the ribs 25 are formed not as concave ribs but as convex ribs, recesses each having the shape corresponding to the outer surface shape of the rib 25 may be provided on the cavity formation surface 80b of the mold 80 instead of the ridges 81.

The presently disclosed techniques are not limited to the foregoing embodiment, and various changes are possible within the scope of the present disclosure.

Although the foregoing embodiment describes the case where the pair of outside air introduction ports 14 are provided in the outer mouth portion 11, the number of outside air introduction ports 14 may be one or more.

Although the foregoing embodiment describes the case where the outside air introduction port 14 is a through hole formed through the outer mouth portion 11, the presently disclosed techniques are not limited to such. For example, the outside air introduction port 14 may be a gap formed between the upper end of the outer mouth portion 11 and the upper end of the inner mouth portion 21 to open the air passage 32 to the outside.

The neck ring 11b may be omitted from the outer mouth portion 11.

The shoulder portion 12 and the barrel portion 13 may have any of various shapes.

Although the foregoing embodiment describes the case where the double container 1 is used as a squeeze-type discharge container to which a discharge cap having a discharge port is attached at the outer mouth portion 11 and that discharges the content liquid when the barrel portion 13 is squeezed, the double container 1 may be used as a pump-type container in which the barrel portion 13 has predetermined rigidity and is not easily deformable by squeezing and to which a pump-type discharge tool is attached at the outer mouth portion 11.

Although the foregoing embodiment describes the case where the recesses 71 forming the thin wall portions 70 are provided in the outer preform 50, the present disclosure is not limited to such. Ridges forming thick wall portions may be provided in the outer preform 50 so that the double container 1 having thick wall portions extending in the vertical direction in the shoulder portion 12 will be produced by blow molding. Such recesses 71 or ridges may be provided not on the inner surface of the outer preform 50 but on the outer surface of the outer preform 50.

REFERENCE SIGNS LIST 1 double container
10 outer layer body
11 outer mouth portion
11a male screw
11b neck ring
12 shoulder portion
13 barrel portion
13a bottom part
14 outside air introduction port
20 inner layer body
21 inner mouth portion
21a flange
21b upper tube
21c inclined tube
21d lower tube
22 containing portion
23 gap
24 ridge
25 rib
30 thin wall portion
31 depression
32 air passage
40 preform assembly
50 outer preform
51 outer mouth portion
51a male screw
51b neck ring
52 outside air introduction port
53 stretch portion
53a diameter decrease portion
53b stretch portion main body
60 inner preform
61 inner mouth portion
61a flange
61b upper tube
61c inclined tube
61d lower tube
62 gap
63 stretch portion
64 ridge
70 thin wall portion
71 recess
72 mouth portion
80 mold
80a cavity
80b cavity formation surface
O center axis

The invention claimed is:

1. A preform assembly comprising:
an outer preform that includes a tubular outer mouth portion and a stretch portion connected to the outer mouth portion and in which a recess or ridge extending in a vertical direction is provided on an inner surface of the stretch portion; and
an inner preform that includes a tubular inner mouth portion and a stretch portion connected to the inner mouth portion, wherein:
an outside air introduction port communicating with a part between the outer preform and the inner preform is provided in a mouth portion composed of the outer mouth portion and the inner mouth portion located on an inner side of the outer mouth portion,
the stretch portion in the outer preform has a diameter decrease portion in which an inner diameter gradually decreases downward from the outer mouth portion, and
the recess or ridge is provided in the diameter decrease portion.

2. The preform assembly according to claim 1, wherein the outside air introduction port is formed by a through hole passing through the outer mouth portion, and
a ridge extending in the vertical direction is provided on an outer surface of the inner preform.

* * * * *